United States Patent [19]

Shiraishi et al.

[11] Patent Number: 5,001,637
[45] Date of Patent: Mar. 19, 1991

[54] STEERING WHEEL TURNING ANGLE DETECTOR AND METHOD FOR CONTROLLING YAWING FOR VEHICLE

[75] Inventors: Shuji Shiraishi; Osamu Yamamoto; Hironobu Kiryu, all of Wako, Japan

[73] Assignee: Honda Giken Kogyo Kabushiki Kaisha, Tokyo, Japan

[21] Appl. No.: 385,517

[22] Filed: Jul. 27, 1989

[30] Foreign Application Priority Data

Aug. 1, 1988 [JP] Japan ................................ 63-192301
Aug. 1, 1988 [JP] Japan ................................ 63-192302

[51] Int. Cl.$^5$ ............................................ B62D 5/00
[52] U.S. Cl. ................................ 364/424.05; 180/142
[58] Field of Search .................. 364/424.05; 180/79.1, 180/141-143; 74/388 PS

[56] References Cited

U.S. PATENT DOCUMENTS

| 4,706,771 | 11/1987 | Kawabe et al. | 180/142 |
| 4,706,979 | 11/1987 | Kawabe et al. | 364/424.05 |
| 4,718,685 | 1/1988 | Kawabe et al. | 180/142 |
| 4,720,791 | 1/1988 | Daido | 180/142 |
| 4,767,588 | 8/1988 | Ito | 180/79.1 |
| 4,834,204 | 5/1989 | Ito et al. | 180/142 |
| 4,836,319 | 6/1989 | Haseda et al. | 180/79.1 |
| 4,840,389 | 6/1989 | Kawabe et al. | 180/140 |
| 4,856,607 | 8/1989 | Sueshige et al. | 180/142 |

Primary Examiner—Gary Chin
Attorney, Agent, or Firm—Armstrong, Nikaido, Marmelstein, Kubovcik & Murray

[57] ABSTRACT

A steering wheel turning angle detector for a vehicle, includes a steering wheel turning angle sensor attached to a steering wheel for detecting a steering wheel turning angle, a yaw rate detector for detecting a yaw rate of the vehicle, a steering wheel turning angle prediction circuit, receiving an output from the yaw rate detecting means for predicting the steering wheel turning angle in response to the detected yaw rate, and a steering wheel turning angle correcting circuit, receiving output signals from the steering wheel turning angle sensor and the steering wheel angle prediction circuit, for correcting an output value of the steering wheel turning angle sensor in response to an error between outputs from the steering wheel turning angle sensor and the steering wheel turning angle prediction circuit.

8 Claims, 4 Drawing Sheets

FIG. 3
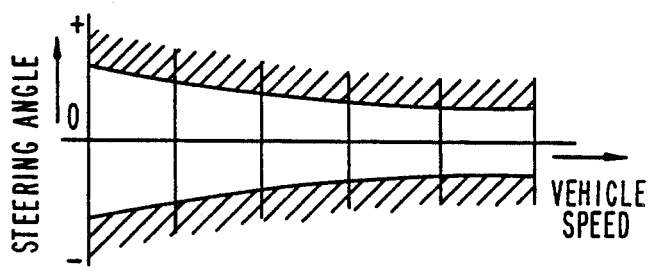
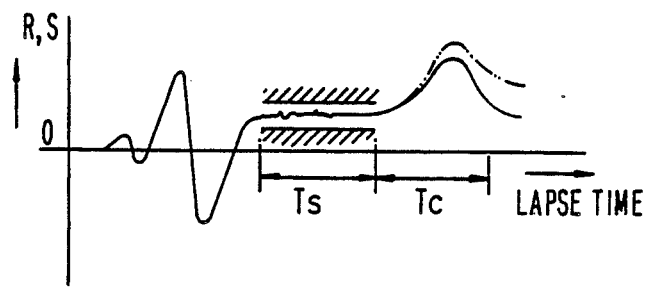
FIG. 4
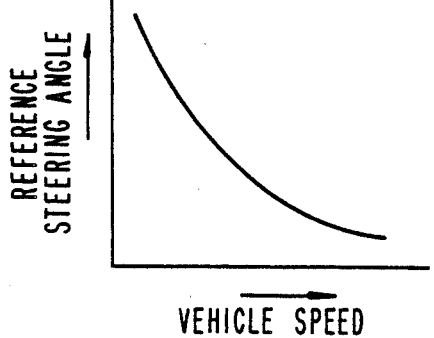
FIG. 5
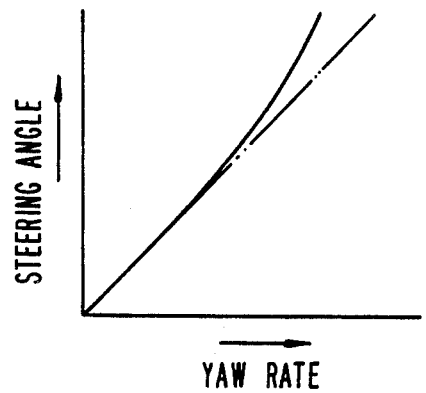
FIG. 6
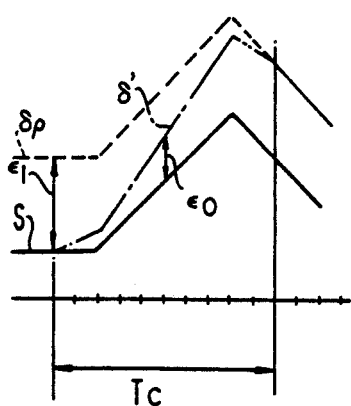
FIG. 7

STEERING WHEEL TURNING ANGLE DETECTOR AND METHOD FOR CONTROLLING YAWING FOR VEHICLE

BACKGROUND OF THE INVENTION

1. Field of the Invention

The present invention relates to a steering wheel turning angle detector for a vehicle to detect a steering wheel turning angle on the basis of the output of a steering wheel turning angle sensor attached to a steering wheel and a method for controlling yawing motion of the vehicle on the basis of the output of the steering wheel turning angle sensor.

2. Description of the Prior Art

Heretofore, a steering wheel turning angle sensor attached to a steering wheel has a pulser for generating a single pulse at the neutral point of a steering wheel turning angle, predicts the neutral point of the steering wheel turning angle by the pulser, and resets a counted pulse value.

However, when the steering wheel turning angle sensor is attached to the steering wheel, the steering wheel turning angle is frequently displaced from the actual steering wheel turning angle. If there is no displacement upon attachment of the steering wheel turning angle sensor, the neutral point might be displaced due to any external force during the movement of the vehicle. If the neutral point is displaced in this manner, since the counted pulse value is reset upon reception of the neutral point pulse even if the neutral point pulse does not coincide with the neutral point of the actual steering wheel turning angle, the counted value does not indicate a suitable steering angle value.

Further, a steering wheel turning angle sensor attached to a steering wheel counts the pulses of a pulser provided in a steering column to measure a steering wheel turning angle, and the yawing motion of a vehicle is controlled with the detected steering wheel turning angle value.

SUMMARY OF THE INVENTION

It is therefore an object of the present invention to provide a steering wheel turning angle detector for a vehicle which can eliminate the above-described deficiency of the conventional detector and which can detect a steering wheel turning angle near an actual steering wheel turning angle by correcting the output of a steering wheel turning angle sensor irrespective of the attaching state of the steering wheel turning angle sensor to a steering wheel.

According to the detector in accordance with one feature of the present invention, there is provided a steering wheel turning angle detector for a vehicle comprising a steering wheel turning angle sensor attached to a steering wheel to detect a steering wheel turning angle, yaw detecting means for detecting the yaw motion or yaw rate of the vehicle, steering wheel turning angle predicting means for predicting the steering wheel turning angle from the yawing state, and steering wheel turning angle correcting means for correcting the output value of the steering wheel turning angle sensor on the basis of an error between the output signals of the steering wheel turning angle sensor and the steering wheel turning angle predicting means.

According to the detector in accordance with another feature of the present invention, there is also provided a steering wheel turning angle detector for a vehicle comprising a steering wheel turning angle sensor attached to a steering wheel to detect a steering wheel turning angle, wheel speed difference detecting means for detecting the difference of the left and right wheel speeds of the vehicle, steering wheel turning angle predicting means for predicting a steering wheel turning angle from the difference of the left and right wheel speeds, and steering wheel turning angle correcting means for correcting the output value of the steering wheel turning angle sensor on the basis of an error between the output signals of the steering wheel turning angle sensor and the steering wheel turning angle predicting means.

According to the detector in accordance with the one feature described above, the output of the steering wheel turning angle sensor is corrected by the steering wheel turning angle predicted from the yaw rate of the vehicle thereby to obtain a steering wheel turning angle near the actual steering wheel turning angle.

Further, according to the detector in accordance with the other feature described above, the steering wheel turning angle can be predicted from the difference of the left and right wheel speeds, and the output of the steering wheel turning angle sensor is corrected by the predicted steering wheel turning angle. Thus, the steering wheel turning angle near the actual steering wheel turning angle can be obtained.

It is another object of the present invention to provide a method for controlling yawing motion of a vehicle which can eliminate the difficulty of the conventional method and which can control the yaw motion or yaw rate on the basis of an accurate steering angle by correcting the output of a steering wheel turning angle sensor, and detecting the steering wheel turning angle near an actual steering wheel turning angle, irrespective of the attaching state of the steering wheel turning angle sensor to a steering wheel.

According to another feature of the present invention to achieve the above-mentioned object, there is provided a method for controlling yawing motion of a vehicle by controlling the yaw motion or yaw rate on the basis of the output of a steering wheel turning angle sensor attached to a steering wheel comprising the steps of predicting a steering wheel turning angle, and gradually correcting the output value of said steering wheel turning angle sensor on the basis of an error between the predicted steering wheel turning angle and the detected steering wheel turning angle of the steering wheel turning angle sensor for a predetermined period of time.

According to the method in accordance with the present invention, the output of the steering wheel turning angle sensor is corrected by an error from the predicted steering wheel turning angle to obtain a steering wheel turning angle near the actual steering wheel turning angle, and it can be gradually corrected within a predetermined time, and hence the abrupt correction control of the yaw motion of the vehicle can be avoided.

The above and other objects, features and advantages of the invention will become apparent from reading of the following description taken in conjunction with the accompanying drawings.

BRIEF DESCRIPTION OF THE DRAWINGS

FIGS. 1 to 7 illustrate one embodiment of the present invention, wherein:

FIG. 1 is a block diagram showing the entire arrangement of the invention;

FIG. 2 is a flowchart showing a processing procedure;

FIG. 3 is a graph showing the set state of an allowable steering angle width;

FIG. 4 is a view showing an allowable width for determining the yaw rate and the normal range of the steering wheel turning angle;

FIG. 5 is a graph showing a reference steering gain;

FIG. 6 is a graph showing the relationship between the yaw rate and the vehicle speed constant state of the steering wheel turning angle;

FIG. 7 is a graph illustrating a steering wheel turning angle correcting procedure.

DESCRIPTION OF THE PREFERRED EMBODIMENTS

Figure 1:
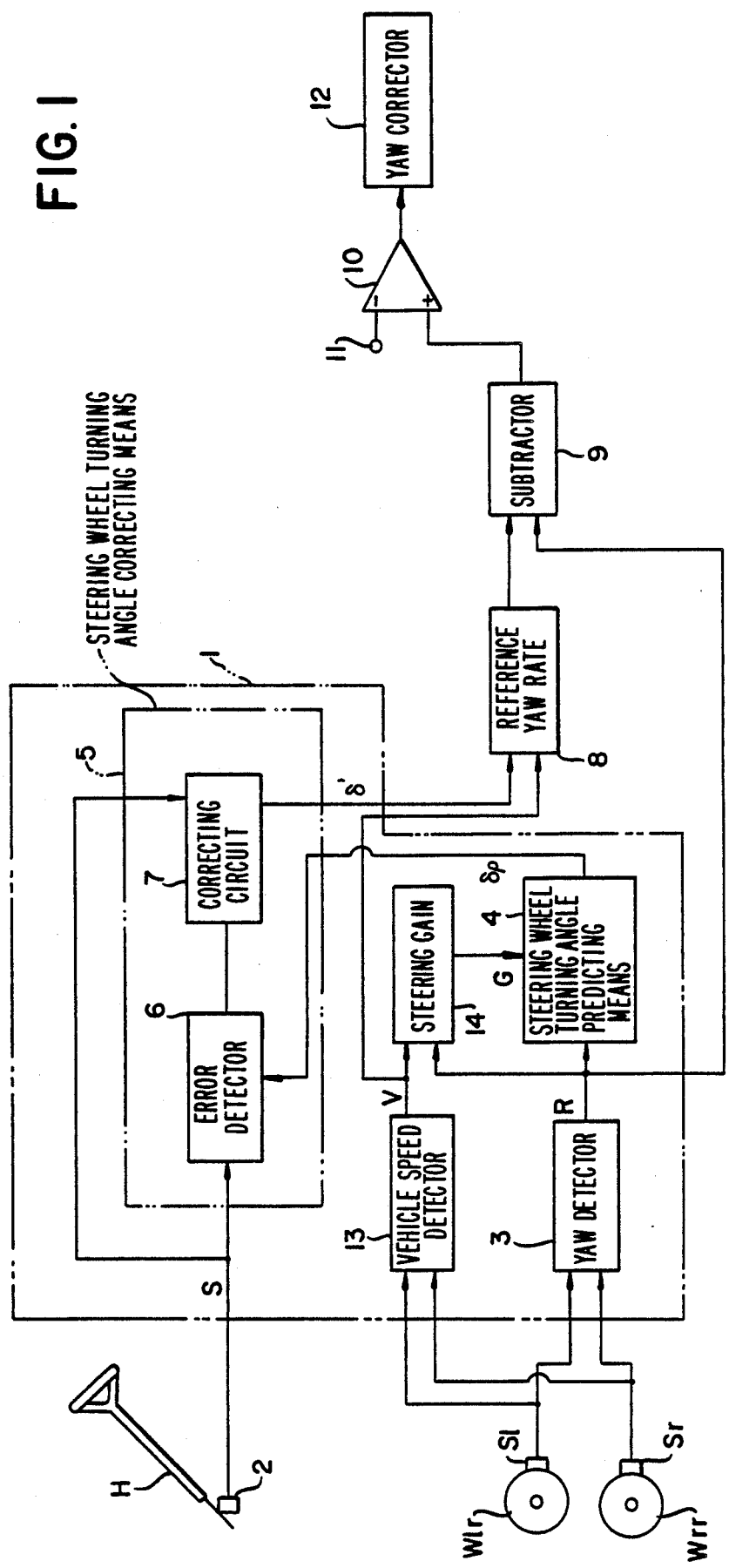

The present invention will now be described by way of embodiments with reference to the accompanying drawings. Referring first to FIG. 1 showing an embodiment of the present invention, speed sensors Sl and Sr are respectively attached to left and right rear wheels Wlr and Wrr as freely rotatable wheels in a front wheel-drive vehicle. The output signals of the speed sensors Sl and Sr are input to a steering wheel turning angle detector 1 preferably comprising a computer. A steering wheel turning angle sensor 2 is attached to a steering wheel H, and the output of the steering wheel turning angle sensor 2 is also input to the steering wheel turning angle detector 1.

The steering wheel turning angle detector 1 comprises a yaw detecting means 3 for detecting a yaw rate R as the yawing state of the vehicle from the outputs of both the speed sensors Sl and Sr, vehicle speed detecting means 13 for detecting a vehicle speed V from the mean value of the outputs of both the speed sensors Sl and Sr, steering gain determining means 14 for determining a steering gain from the output of the yaw detecting means 3 and the output of the vehicle speed detecting means 13, steering wheel turning angle predicting means 4 for predicting the steering wheel turning angle $\gamma_p$ of the vehicle on the basis of the steering gain G and the yaw rate R, and a steering wheel turning angle correcting means 5 correcting the output S of the steering wheel turning angle sensor 2 by the output of the steering wheel turning angle predicting means 4. The steering wheel turning angle correcting means 5 comprises an error detector 6 for detecting an error between the output S of the steering wheel turning angle sensor 2 and the output $\gamma_p$ of the steering wheel turning angle predicting means 4, and a correcting circuit 7 for correcting the output of the steering wheel turning angle sensor 2 by the amount of error.

The output and hence the vehicle speed of the vehicle speed detecting means 13 and the steering wheel turning angle $\gamma'$ obtained by the steering wheel turning angle detector 1 are input to reference yaw rate generating means 8, and the reference yaw rate obtained by the reference yaw rate generating means 8 and the yaw rate R obtained by the yawing detecting means 3 are input to subtractor 9. The subtractor 9 calculates the absolute value of the difference between the reference yaw rate and the yaw rate R. In other words, the displacement of the present yaw rate R from the predicted reference yaw rate is obtained. The output of subtractor 9 is input to the non-inverting input terminal of comparator 10, and a reference value is input from terminal 11 to the inverting input terminal of comparator 10. Accordingly, comparator 10 outputs a signal of high level when the displacement of the present yaw rate R from the predicted reference yaw rate is equal to or larger than the reference value, and the output of comparator 10 is input to yaw correcting means 12, such as, for example, means for correcting a yawing motion by controlling the output of an automotive engine.

Figure 2:
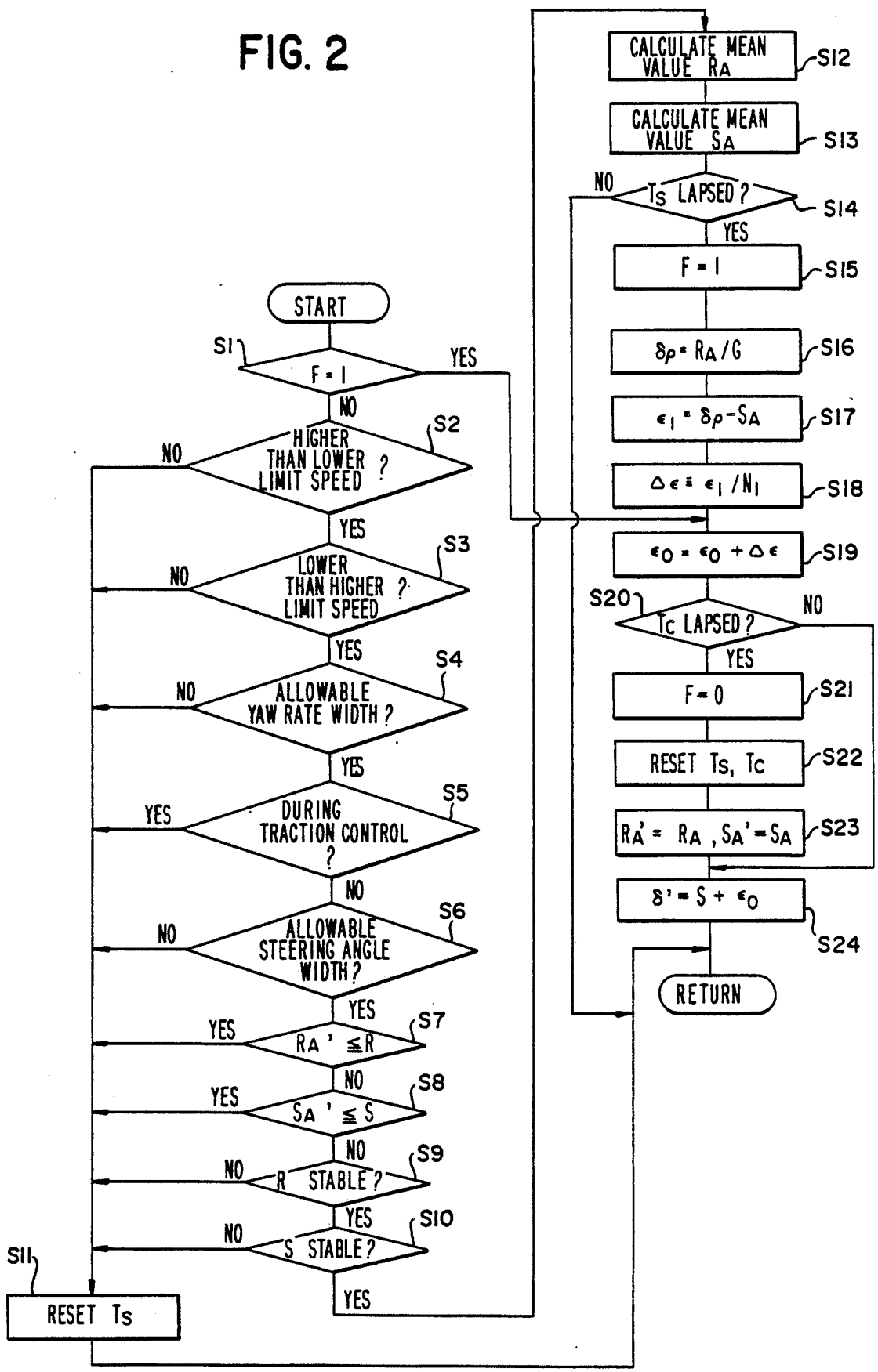

The steering wheel turning angle detector 1 of the computer obtains a steering wheel turning angle by a procedure shown in FIG. 2. In a first step S1, it is determined whether a flag F is "1" or not. The flag F displays whether or not it is currently correcting a steering angle, and the flag F being equal to "1" displays the correcting of the steering angle at present. In case of F=1 in the first step S1, the process advances to a nineteenth step S19, and in case of F=0, the process advances to a second step S2.

The second step S2 to tenth step S10 determine whether the driving state of the vehicle is in a normal range adapted to correct the steering angle or not, and when these steps S2 to S10 determine that the vehicle is in a state out of the normal range, a timer Ts is reset in an eleventh step S11. The timer Ts counts a time required to determine whether the vehicle is in the normal state or not, e.g., two seconds, and the timer Ts is reset whenever the steps S1 to S10 determine the state out of the normal range.

Factors for determining whether the vehicle is in the normal range or not will be individually described. The second step S2 first determines whether or not the vehicle speed V is equal to or higher than a lower limit speed, such as, for example, 8 km/hr, while the third step S3 determines whether or not the vehicle speed V is equal to or lower than an upper limit speed, such as, for example, 50 km/hr. The fourth step S4 determines whether or not the yaw rate R of the vehicle is equal to or lower than an allowable yaw rate width, such as, for example, 5°/sec, and the fifth step S5 determines whether or not a traction control system is in operation, such as a decrease in the output of the engine, an application of brakes, for suppressing the excessive slip of a driving wheel. The sixth step S6 determines whether or not the steering angle S is within an allowable steering angle width. The allowable steering angle width is determined in response to the vehicle speed V is shown in FIG. 3, and the allowable steering angle width is set smaller as the vehicle speed becomes higher.

The seventh step S7 and the eight step S8 determine whether or not the yaw rate R and the steering wheel turning angle S, this time, are equal to or lower than the previous mean yaw rate $R_A'$ and the mean steering wheel turning angle $S_A'$, the process advances to the eleventh step S11. This starts a correcting operation only when the vehicle is in a condition of more straight traveling than the mean yaw rate $R_A$ or the mean steering wheel turning angle $S_A$ (for example, when the steering wheel angle is straightening out) when the error of the steering wheel turning angle sensor 2 is corrected at the previous time, thereby obtaining a more accurate predicted steering wheel turning angle.

The ninth step S9 determines whether or not the yaw rate R is in the normal range. The normal range is set to the range designated by the shaded portion in FIG. 4, and is determined to be in the normal range (in a normal turning or straight traveling state) from the center of the yaw rate R with the yaw rate R when all the conditions from the second step S2 to the eighth step S8 are satisfied initially as the center. The ninth step S9 determines whether or not it is the normal range for a set period of time, such as, for example two seconds or longer to be counted by the timer Ts. The tenth step S10 determines whether or not the steering wheel turning angel S is in the normal range. The normal range for S is set similarly to the normal range for the yaw rate R, and the tenth step S10 determines whether or not it is in the normal range, for example, for two seconds or longer.

As described above, when the second step S2 to the tenth step S10 determine that the driving state of the vehicle is in the normal range, the process advances to a twelfth step S12, and when these steps S2 to S10 determined that the driving state of the vehicle is not in the normal state, the eleventh step S11 resets the timer Ts.

The twelfth step S12 and a thirteenth step S13 calculate the mean value $R_A$ of the yaw rate R and the mean value $S_A$ of the steering wheel turning angle S according to the following first and second equations (1) and (2):

$$R_A = \frac{1}{N}R + \left(1 - \frac{1}{N}\right)R_{A-1} \tag{1}$$

$$S_A = \frac{1}{N}S + \left(1 - \frac{1}{N}\right)S_{A-1} \tag{2}$$

where the N is the number of the cumulative samplings from the start of the calculations of equations (1) and (2), and the equations (1) and (2) employ so-called moving averages for varying the influence to the mean value of the sampling values this time depending upon the lapsed time from the start of calculating the mean value. The suffix ($_{-1}$) designates the value in the previous time period.

Fourteenth step S14 determines whether or not the counting of the set time by the timer Ts is finished, and when the time Ts for determining the normal range is elapsed, a fifteenth step S15 sets the flag F to "1".

Next, sixteenth step S16 displays the process in the steering wheel turning angle predicting means 4, which obtains the predicted steering wheel turning angle $\gamma_p$ by dividing the mean yaw rate $R_A$ by the steering gain G. In other words, $d_r = R_A/G$ is satisfied, and $G = G_O - G'R$, where the $G_O$ is a reference gain determined depending upon the vehicle speed V as shown in FIG. 5, which is obtained theoretically by the following equation (3):

$$G_0 = \frac{1}{nL(1 + KV^2)} \cdot V \tag{3}$$

where the n is a steering gear ratio, L is a wheel base, and K is a stability factor. G' is a correction coefficient for reducing the steering gain when the yaw rate R is increased. In other words, when the vehicle speed is constant, the relationship between the yaw rate and the steering wheel turning angle is shown in FIG. 6, in which the lateral acceleration to be applied to the vehicle is determined by the yaw rate R and the vehicle speed V, the load movement of the vehicle and the variation in the compliance occur by the influence of the lateral acceleration of the vehicle, and the steering gain is altered in response to them. Accordingly, the correction coefficient G' is set in response to the vehicle speed, and the steering gain is approximated to the steering gain during actual movement of the vehicle by correcting the theoretical value $G_O$ of the steering gain by multiplying the correction coefficient G' by the yaw rate R.

A seventeenth step S17 calculates an error $\epsilon_1$. In other words, the seventeenth step S17 calculates the difference ($\epsilon_1 = \gamma_p - S_A$) of the steering wheel turning angle $\gamma_p$ predicted by the steering wheel turning angle predicting means 4 and the mean value $S_A$ of the steering wheel turning angle S obtained by the steering wheel turning angle sensor 2. Further, next eighteenth step S18 calculates the correction amount $\epsilon$ as set forth below:

$$\epsilon = \epsilon_1/N_1 \tag{4}$$

$N_1$ is determined in equation (4) by $N_1 = Tc/T_{loop}$, where the Tc is a time set to correct the steering angle value after the normal range is determined as shown in FIG. 4, and Tc is set, for example, to one second. Accordingly, the equation (4) obtains the correction amount $\epsilon$ in each one loop in the processing procedure shown in FIG. 2.

A nineteenth step S19 obtains a correction value $\epsilon_O$ according to the following equation (5)

$$\epsilon_O = \epsilon_O + \epsilon \tag{5}$$

Further, a twentieth step S20 determines whether or not the time Tc, set to correct the steering angle, has elapsed. If the time Tc has not yet elapsed, the process advances to a twenty-fourth step S24, and if the time Tc has elapsed, then the process advances to a twenty-first step S21. The twenty-first step S21 sets the flag F, a twenty-second step S22 resets the timer Ts, the Tc, and then the twenty-third step S23 sets the mean yaw rate $R_A$ to $R_A'$ and the mean steering wheel turning angle $S_A$ to $S_A'$.

The twenty-fourth step S24 calculates the following equation (6) as the steering wheel turning angle $\gamma'$ output from the steering wheel turning angle detector 1.

$$\gamma' = S + \epsilon_O \tag{6}$$

The operation of this embodiment will now be described. In the processing procedure shown in FIG. 2, the second step S2 to the tenth step S10 determine whether or not the vehicle is in the normal range for correcting the steering wheel turning angle S detected by the steering wheel turning angle sensor 2. If the steps S2 to S10 determine that the vehicle is in the normal range, the fifteenth step S15 sets the flag F, and the process advances to the next step.

As described above, after the vehicle is determined to be in the normal driving state, the sixteenth step S16 to the eighteenth step S18 calculate the correction value $\epsilon$ per one processing loop. In other words, the sixteenth step S16 divides the yaw rate $R_A$ by the steering gain G to obtain the predicted steering angle $\gamma_p$. Then, the seventeenth step S17 obtains the difference $\epsilon_1$ between the predicted steering angle $\gamma_p$ and the mean steering angle $S_A$ on the basis of the output of the steering wheel turning angle sensor 2, and then the eighteenth step S18 obtains the correction amount $\epsilon$ per one processing loop according to the error $\epsilon_1$. The sixteenth step S16 to the eighteenth step S18 are carried out only in the initial processing loop after the driving state of the vehicle is determined to be in the normal state. Thereafter, the process is transferred from the first step S1 to the nineteenth step S19.

Referring now to FIG. 7, if there is an error $\epsilon_1$ between the detected steering wheel turning angle S of the steering wheel turning angle sensor 2 and the predicted steering wheel turning angle $\gamma_p$ of the steering wheel turning angle predicting means 4, the correction value $\epsilon_O$ added with the correction value $\epsilon$ at each processing loop is added to the steering wheel turning angle S, and the output $\gamma'$ of the steering wheel turning angle detector 1 is corrected to the predicted steering wheel turning angle $\gamma_p$ is gradually returned to "0" until the set time Tc has elapsed, the abrupt correction control of the yaw correcting means 12 is avoided by correcting in this redundancy process, and the correction of the yawing motion can be smoothly carried out.

Figure 8:
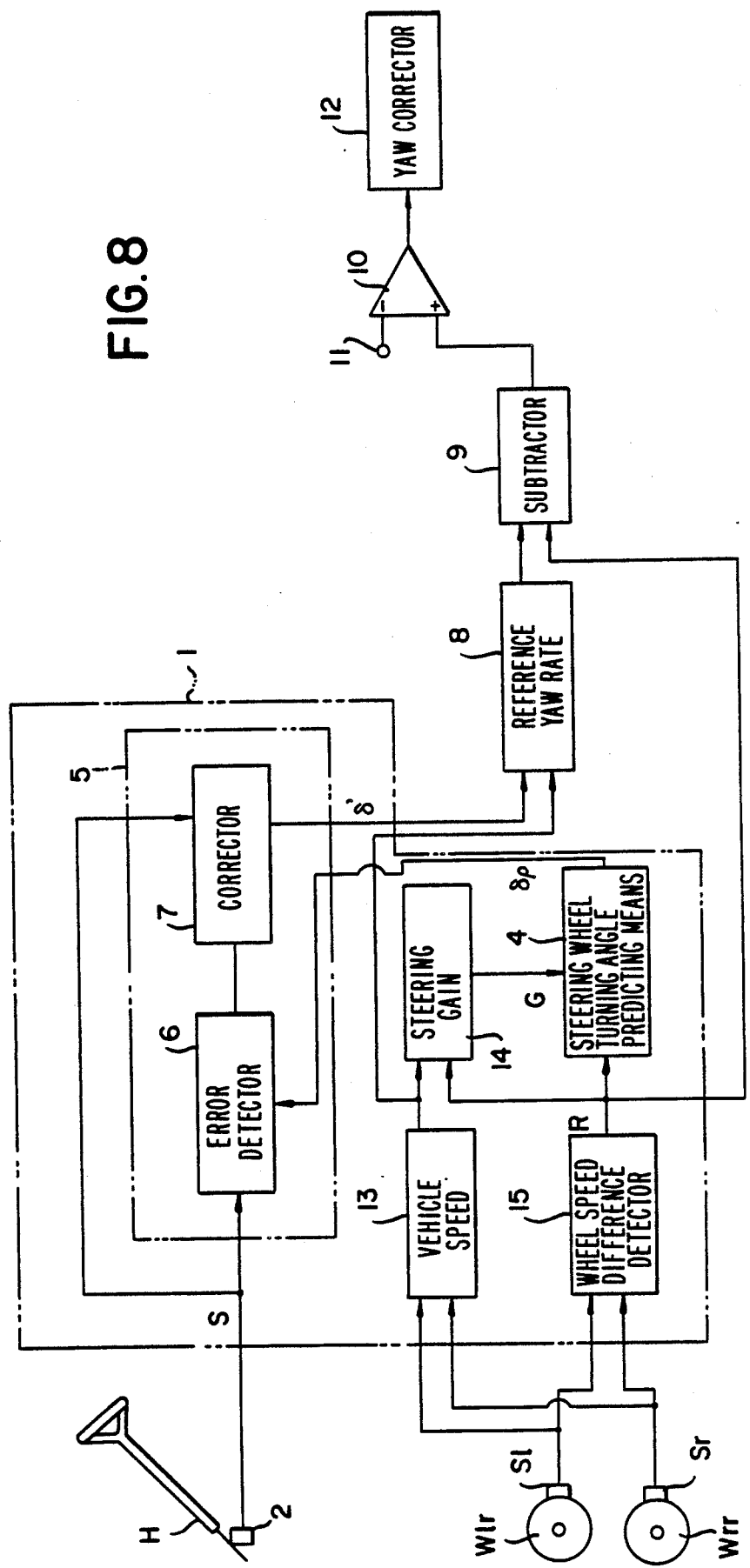
FIG. 8 is a block diagram, corresponding to FIG. 1, of another embodiment of the present invention.

FIG. 8 shows another embodiment of the present invention, wherein the same reference numerals as those in the first embodiment denote the same or equivalent components.

In this second embodiment, it is noted that wheel speed difference detecting means 15 is provided instead of the yaw detecting means 3 of the above-described first embodiment, and the other components are the same as those in the first embodiment described above.

The wheel speed difference detecting means 15 produces the speed difference of the left and right wheels Wlr and Wrr, and the speed difference is input to steering wheel turning angle predicting means 4. Thus, the predicted steering wheel turning angle $\gamma_p$ and the detected steering wheel turning angle S of the steering wheel turning angle sensor 2 are compared, and the same process is carried out as in the first embodiment, thereby obtaining a substantially accurate steering wheel turning angle $\gamma'$. Thus, the same advantages as those in the first embodiment can be provided.

According to the present invention as described above, the steering wheel turning angle detector in accordance with the first feature of the present invention comprises the steering wheel turning angle sensor attached to the steering wheel to detect a steering wheel turning angle, the yaw detecting means for detecting the yawing state of the vehicle, the steering wheel turning angle predicting means for predicting the steering wheel turning angle from the yawing state, and the steering wheel turning angle correcting means for correcting the output value of the steering wheel turning angle sensor on the basis of an error between the output signals of the steering wheel turning angle sensor and the steering wheel turning angle predicting means. Therefore, a substantially accurate steering wheel turning angle can be obtained irrespective of the attaching state of the steering wheel turning angle sensor to the steering wheel.

In the steering wheel turning angle detector according to another feature of the present invention, the wheel speed difference detector is provided instead of the yaw detecting means in the first embodiment. Therefore, a substantially accurate steering wheel turning angle can be obtained irrespective of the attaching state of the steering wheel turning angle sensor to the steering wheel, as in the detector according to the first feature of the above-described first embodiment.

Further, according to the method of the present invention, as described above, the method predicts the steering wheel turning angle, and gradually corrects the output value of the steering wheel turning angle sensor on the basis of an error between the predicted steering wheel turning angle and the detected steering wheel turning angle for the steering wheel turning angle sensor for a predetermined period of time. Therefore, the method can obtain a substantially accurate steering wheel turning angle irrespective of the attaching state of the steering wheel turning angle sensor to the steering wheel, and correct it gradually within a predetermined time, thereby avoiding the abrupt correction control of yawing motion of the vehicle.

Although specific embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A steering wheel turning angle detector for a vehicle, comprising:

a steering wheel turning angle sensor attached to a steering wheel for detecting a steering wheel turning angle and outputting a steering angle value;

yaw rate detecting means for detecting a yaw rate of the vehicle and outputting a yaw rate thereof;

steering wheel turning angle predicting means, receiving an output from said yaw rate detecting means, for outputting a predicted steering angle value in response to the detected yaw rate; and steering wheel turning angle value correcting means, receiving output signals from said steering wheel turning angle sensor and said steering wheel angle predicting means, for correcting said steering angle value of the steering wheel turning angle sensor as a detected steering wheel angle which is corrected in response to an error between outputs from said steering angle value and said predicted steering angle value.

2. The steering wheel turning angle detector of claim 1, wherein said steering wheel turning angle predicting means receives an output from a steering gain determining means for determining a steering gain as a function of vehicle speed, such that the predicted steering wheel turning angle is determined in response to said steering gain and said detected yaw rate.

3. The steering wheel turning angle detector of claim 2, wherein said steering wheel turning angle predicting means determines said predicted steering turning angle as a function of the yaw rate divided by the steering gain.

4. The steering wheel turning angle detector of any one of claims 2 or 3 wherein said steering wheel turning angle predicting means includes means for determining said steering gain.

5. The steering wheel turning angle detector of claim 4, wherein said means for determining said steering gain of said steering wheel turning angle predicting means, determines said steering gain in response to said yaw rate and the vehicle speed.

6. A steering wheel turning angle detector for a vehicle, comprising:

a steering wheel turning angle sensor attached to a steering wheel for detecting a steering wheel turning angle and outputting a steering angle value;

wheel speed difference detecting means for detecting a difference in left and right wheel speeds of the vehicle;

steering wheel turning angle predicting means, receiving an output from said difference detecting means, for outputting a predicted steering angle value based on the difference in said left and right wheel speeds; and steering wheel turning angle value correcting means, receiving output signals from said steering wheel turning angle sensor and said steering wheel turning angle predicting means, for correcting said steering angle value of the steering wheel turning angle sensor as a detected steering wheel angle which is corrected in response to an error between outputs from said steering angle value and said predicted steering angle value.

7. The steering wheel turning angle detector of claim 6, wherein said steering wheel turning angle predicting means receives an output from a steering gain determining means for determining steering gain as a function of vehicle speed, such that the predicted steering angle is determined in response to said steering gain and said difference in left and right wheel speeds.

8. A method for controlling yaw motion of a vehicle, comprising the steps of:

detecting a steering wheel angle output value from a steering wheel turning angle sensor coupled to a steering wheel of the vehicle;

predicting a predicted steering wheel turning angle value based upon detected yaw rate; and gradually correcting the detected steering wheel angle output value in response to an error determined between the predicted steering wheel turning angle and the detected steering wheel angle output value from the steering wheel turning angle sensor for a predetermined period of time; and controlling a yaw motion of the vehicle in response to the corrected steering wheel angle output value.

* * * * *